3,527,759
PROCESS FOR THE PREPARATION OF
PYRAZINAMIDOGUANIDINES
Kenneth L. Shepard, Ambler, Pa., assignor to Merck & Co., Inc., Rahway, N.J., a corporation of New Jersey
No Drawing. Filed Sept. 29, 1967, Ser. No. 671,564
Int. Cl. C07d 51/76
U.S. Cl. 260—250                5 Claims

ABSTRACT OF THE DISCLOSURE

A process is described for the preparation of pyrazinamidoguanidines which comprises the reaction of a pyrazinoic acid hydrazide with a cyanamide in the very favorable medium of pyridine hydrochloride which practically eliminates competing side reactions through its non-aqueous catalysis.

---

This invention relates to a method for the preparation of pyrazinamidoguanidine compounds from pyrazinoic hydrazides by reaction with a cyanamide compound in the presence of pyridine hydrochloride. The process can be illustrated by the following equation:

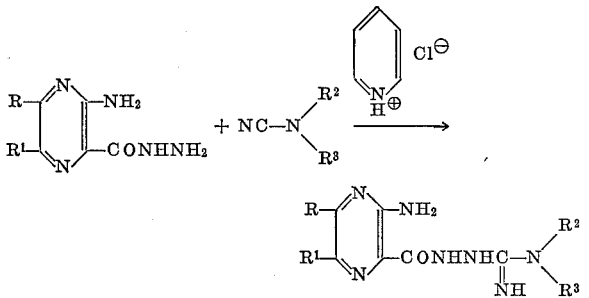

wherein, in each of the above structures R represents:

(a) hydrogen,
(b) hydroxy,
(c) alkyl, preferably lower alkyl of from 1 to about 6 carbon atoms, such as methyl, ethyl, propyl, butyl, pentyl, hexyl and their branched chain isomers, particularly methyl or ethyl,
(d) mononuclear aryl, especially phenyl, either unsubstituted or substituted, especially with halo, such as chloro or bromo,
(e) mercapto,
(f) lower alkylthio of from 1 to about 5 carbon atoms, particularly methyl-, ethyl-, or propylthio, but also pentylthio,
(g) phenyl-lower alkylthio wherein the alkyl moiety has from 1 to 3 carbons, such as benzylthio, or phenethylthio or the like,
(h) trifluoromethyl,
(i)

wherein $R^5$ represents:

(1) hydrogen,
(2) alkyl, preferably lower alkyl of from 1 to about 6 carbon atoms such as methyl, ethyl, propyl, butyl, pentyl, or hexyl, either straight or branched chain, particularly methyl, or ethyl,
(3) lower alkenyl of from 2 to about 5 carbon atoms, particularly allyl, or propenyl, and $R^6$ represents:
(1) hydrogen,
(2) lower alkenyl of from 2 to about 5 carbon atoms, particularly allyl or propenyl,
(3) lower cycloalkyl, having from 3 to about 8 carbon atoms, particularly cyclopropyl, cyclopentyl or cyclohexyl,
(4) mononuclear aryl, especially phenyl, either unsubstituted or substituted with for example lower alkyl having from 1 to 3 carbons or halo, especially chloro, bromo and fluoro,
(5) alkyl, preferably lower alkyl of from 1 to about 6 carbon atoms such as methyl, ethyl, propyl, butyl, pentyl or hexyl, either straight or branched chain, and either unsubstituted or substituted with, for example, (a) hydroxy,
(b) di(lower alkyl)amino wherein each lower alkyl group has from 1 to about 4 carbon atoms, particularly methyl, or ethyl,
(c) lower cycloalkyl having from 3 to about 8 nuclear carbon atoms, particularly cyclopropyl, cyclopentyl or cyclohexyl,
(d) mononuclear aryl, especially phenyl, either unsubstituted or substituted with for example lower alkyl having from 1 to 3 carbons or halo especially chloro, bromo or fluoro,
(e) ω,ω,ω-trifluoro,
(f) heterocyclic such as pyridyl, furyl, or the like,
(g) lower alkoxy of from 1 to about 4 carbon atoms particularly, methoxy or ethoxy, and when $R^5$ and $R^6$ represent lower alkyl they can be linked together to form, with the nitrogen atom to which they are attached, a heterocyclic group, e.g., pyrrolidinyl, piperidino, or the like;

$R^1$ represents:

(a) hydrogen,
(b) halo, such as chloro, bromo or iodo,
(c) lower alkyl of from 1 to about 6 carbon atoms such as methyl, ethyl, propyl, butyl, pentyl or hexyl, either straight or branched chain,
(d) lower cycloalkyl of from 3 to about 6 carbon atoms such as cyclopropyl, cyclohexyl, or the like,
(e) mononuclear aryl, especially phenyl, either unsubstituted or substituted with for example halo, especially chloro or bromo,
(f) trifluoromethyl;

$R^2$ and $R^3$ can be similar or dissimilar radicals, and each represents:

(a) hydrogen,
(b)) alkyl, preferably lower alkyl of from 1 to about 5 carbon atoms, either straight or branched chain, e.g., methyl, ethyl, propyl, isopropyl, butyl, secondary butyl, isobutyl, tertiary butyl, pentyl, isopentyl, neopentyl or the like, and either unsubstituted or substituted with such as aryl, especially phenyl, or naphthyl either unsubstituted or substituted such as with halo, e.g., chloro, bromo, or fluoro, lower alkyl, e.g., methyl, ethyl, propyl or isopropyl, or lower alkoxy, e.g., methoxy, ethoxy, propoxy, or isopropoxy,
(c) alkenyl, preferably, lower alkenyl, e.g., allyl, propenyl, or the like, and
(d) aryl, especially naphthyl or phenyl.

The compounds prepared by the novel process of this invention possess diuretic properties and may be used for the treatment of edema, hypertension, and other diseases known to be responsive to diuretic therapy.

Pyrazinamidoguanidines have been prepared in the past by (1) the reaction of 2-alkyl-4H-pyrazino[2,3-d][1,3]-oxazin-4-ones with aminoguanidines followed by hydrolysis of the product, (2) the reaction of alkyl esters of pyrazinoic acids with aminoguanidines, (3) the reaction of pyrazinoic acid hydrazides with 2-methyl-2-thiopseudourea, and (4) reaction of pyrazinoic acid hydrazides with cyanamides, in aqueous acid solution. In any of the foregoing methods for the preparation of pyrazinamidoguanidines a competing reaction, that is, cyclization of the desired product to a pteridine is operative and the yield of pyrazinamidoguanidine available is directly relation to the ease of cyclization of the particular product, the reaction conditions, and time required for the initial condensation; the more drastic the conditions and the longer the time the lower the yield. Thus, although prolonged reaction times at elevated temperatures may result in complete or almost complete interaction of the starting materials to form product, the competing reaction of cyclization with comparable rate characteristics can result in consumption of most or all of the desired product thus making its isolation impractical or impossible.

The above considerations were particularly true in synthesis by the method designated as (4) wherein the pyrazinoic acid hydrazide was heated with a cyanamide in aqueous acid. This reaction commonly required as long as 24 hours under the vigorous conditions of refluxing aqueous acid solutions which favored cyclization of the desired pyrazinamidoguanidine product and had the added undesirable feature of causing hydrolysis of the cyanamide starting material, necessitating multiple additions of the cyanamide during the course of the reaction and involving, in total, a large excess of this starting material.

It has now been found as a surprising feature of this invention that pyrazinoic acid hydrazides and cyanamides can be condensed to form pyrazinamidoguanidines smoothly and in good yield by conducting the reaction in the unusual reaction medium of fused pyridine hydrochloride which acts as solvent and catalyst for the desired reaction. The use of pyridine hydrochloride as the reaction medium has the surprising advantages that: (1) due to its non-aqueous nature, hydrolysis of the cyanamide starting material does not occur and hence only a slight excess of cyanamide is required, and it is added in one portion; (2) due to its catalytic effect the required reaction time is greatly reduced from about 20 or more hours to about one hour thus reducing the possibility of side reactions and greatly enhancing the yield to the extent that some products previously unavailable from the aqueous system can now be prepared by this novel process.

The process of this invention is conducted by mixing the pyrazinoic acid hydrazide, a slight excess of the cyanamide, and pyridine hydrochloride and heating the mixture to between its melting point and about 150° C., advantageously from about 120° C. to 150° C. for about 1 to 2 hours. The cooled mixture generally then is diluted with water and made basic with aqueous sodium or potassium hydroxide, which causes precipitation of the product. The cyanamide reactant can be cyanamide, sodium cyanamide, sodium hydrogen cyanamide, calcium cyanamide, or other metal cyanamide salts, for preparing those pyrazinamidoguanidines which are unsubstituted on the guanidine, or mono- or di-substituted organic cyanamides wherein at least one of the variables $R^2$ and $R^3$ is other than hydrogen.

The process of this invention is generally applicable to the preparation of (3-aminopyrazinamido)guanidines having any combination of substituents, provided only that a method is available for the preparation of the requisite pyrazinoic acid hydrazide starting materials, and subject to the limitation that any substituent on the pyrazine ring must be inert to cyanamide during the reaction.

Many of the required intermediate mono- and disubstituted cyanamides are commercially available. The mono-substituted cyanamides useful for this reaction include compounds such as methyl-, ethyl-, isobutyl, t-butyl-, n-amyl-, n-hexyl-, n-heptyl-, n-octyl-, benzyl-, phenyl-, and p-chlorophenyl-cyanamide. These cyanamides can be prepared, for example, by treating the appropriate primary amines with cyanogen bromide in an organic solvent such as ether, aqueous alcohol, or ethyl acetate.

Examples of suitable disubstituted cyanamides include dimethyl-, diethyl-, diisopropyl-, di-n-butyl-, di-n-amyl-, di(p-dimethylaminophenyl)-, benzyl-methyl, benzylethyl-, diallyl-cyanamide and the like. They can be prepared by action of potassium cyanide and bromine on an aqueous suspension of the appropriate secondary amine, or by the direct addition of cyanogen bromide to solutions of the secondary amine.

The pyrazinoic acid hydrazides used as starting materials can be made by several different chemical processes and one particular process may be more useful than another for making a specific compound. One generally useful process can be represented as follows:

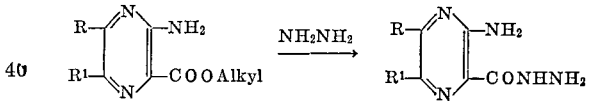

wherein R and $R^1$ have the meanings defined above. This reaction is carried out in a conventional manner, for example by refluxing the reactants in a solution of absolute ethanol for several hours. The yield is approximately theoretical.

PREPARATION OF PYRAZINOIC ACID HYDRAZIDES

Example 1.—3-amino-5-diethylamino-6-chloropyrazinoic acid hydrazide

Hydrazine (20 ml. of 64% aqueous solution) is added to a solution of methyl 3-amino-5-diethylamino-6-chloropyrazinoate (10.0 g., 0.04 mole) in ethanol (250 ml.) and the reaction mixture is refluxed for 4 hours. The solvent is then removed in vacuo and the residue is washed out with water and dried to yield 9.0 g. (87%) of 3-amino-5-diethylamino-6-chloropyrazinoic acid hydrazide, melting at 137–140° C. After crystallization from 2-propanol the product melts at 142–145° C.

Analysis.—Calculated for $C_9H_{15}ClN_6O$ (percent): C, 41.79; H, 5.84; N, 32.49. Found (percent): C, 42.00; H, 6.05; N, 32.10.

By employing substantially the same method described in Example 1, but substituting for methyl 3-amino-5-diethylamino-6-chloropyrazinoate used therein, equimolar quantities of the methyl 3-amino-5-R-6-$R^1$-pyrazinoates depicted in Table I, under starting materials, there are produced according to Equation I, the corresponding 3-amino-5-R-6-$R^1$-pyrazinoic acid hydrazides, also shown in Table 1, under the heading "Products."

I. 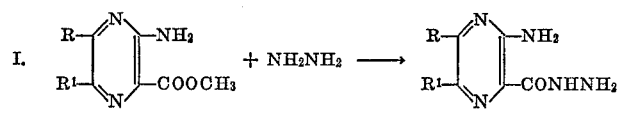

| | Starting material | | | Product | | | | | | |
|---|---|---|---|---|---|---|---|---|---|---|
| | | | | | | Analysis | | | | |
| | | | | | | Calculated | | | Found | | |
| Example | R | $R^1$ | M.P. (° C.) | Formula | C | H | N | C | H | N |
| 2 | $C_2H_5NH-$ | Cl | 168–70 | $C_7H_{11}ClN_6O$ | 36.45 | 4.80 | 36.44 | 36.71 | 4.87 | 36.71 |
| 3 | $CH_2=CHCH_2NH-$ | Cl | 158–60 | $C_8H_{11}ClN_6O$ | 39.59 | 4.57 | 34.63 | 39.66 | 4.77 | 34.65 |
| 4 | $\begin{array}{c}CH_3\\N-\\C_2H_5\end{array}$ | Cl | 134–6 | $C_8H_{13}ClN_6O$ | 39.27 | 5.36 | 34.35 | 39.36 | 5.51 | 34.39 |
| 5 | $\begin{array}{c}CH_3\\CH-NH-\\CH_3\end{array}$ | Cl | 132–4 | $C_8H_{13}ClN_6O$ | 39.27 | 5.36 | 34.35 | 39.00 | 5.50 | 34.35 |
| 6 | $Cl-\langle\rangle-CH_2NH-$ | Cl | 158–60 | $C_{12}H_{12}Cl_2N_6O$ | 44.05 | 3.70 | 25.69 | 43.86 | 3.75 | 25.61 |
| 7 | $CH_3-NH-$ | Cl | 257–60 | $C_6H_9ClN_6O$ | Compound not purified | | | | | |
| 8 | $n-C_4H_9-NH-$ | Cl | 162–5 | $C_9H_{15}ClN_6O$ | 41.78 | 5.84 | 32.49 | 42.10 | 6.01 | 32.63 |
| 9 | $n-C_3H_7-NH-$ | Cl | 171–3 | $C_8H_{13}ClN_6O$ | 39.27 | 5.35 | 35.35 | 39.33 | 5.38 | 35.4 |
| 10 | $HOCH_2CH_2NH-$ | Cl | 184–5 | $C_7H_{11}ClN_6O_2$ | 34.08 | 4.50 | 34.07 | 34.31 | 4.59 | 34.3 |
| 11 | $\langle\rangle-NH-$ | Cl | 143–5 | $C_{10}H_{15}ClN_6O$ | 44.36 | 5.58 | 31.05 | 44.52 | 5.71 | 30.85 |
| 12 | $\begin{array}{c}CH_3\\N-CH_2CH_2NH-\\CH_3\end{array}$ | Cl | 161–3 | $C_9H_{16}ClN_7O$ | 39.49 | 5.89 | 35.82 | 39.86 | 5.94 | 36.04 |
| 13 | $CH_3S-$ | Cl | 240–2 | $C_6H_8ClN_5OS$ | 30.84 | 3.45 | 29.27 | 31.11 | 3.45 | 29.92 |
| 14 | $HS-$ | Cl | 218–20 | $C_5H_6ClN_5OS$ | Compound not purified | | | | | |
| 15 | $HO-$ | Cl | >300 | $C_5H_6ClN_5O_2$ | 29.49 | 2.97 | 34.40 | 29.58 | 3.16 | 34.17 |
| 16 | $n-C_3H_7S-$ | Cl | 166–8 | $C_8H_{11}ClN_5OS$ | 36.71 | 4.62 | 26.76 | 37.08 | 4.44 | 27.15 |
| 17 | $CH_3-$ | Br | 202–5 | $C_6H_8BrN_5O$ | 29.28 | 3.28 | 28.46 | 29.20 | 3.09 | 28.60 |
| 18 | $\begin{array}{c}CH_3\\N-\\CH_3\end{array}$ | $\langle\rangle-$ | 153–4 | $C_{13}H_{16}N_6O$ | 57.34 | 5.92 | 30.86 | 57.77 | 5.81 | 30.71 |
| 19 | $C_2H_5S-$ | Cl | 196–9 | $C_7H_{10}ClN_5OS$ | 33.94 | 4.07 | 28.27 | 34.13 | 3.68 | 28.68 |
| 20 | $n-C_5H_{11}S-$ | Cl | 265–7 (HCl) | $C_{10}H_{16}ClN_5OS\cdot HCl$ | 36.81 | 5.25 | 21.47 | 37.01 | 5.00 | 21.63 |
| 21 | $\begin{array}{c}CH_3\\N-\\n-C_3H_7\end{array}$ | Cl | 133–6 | $C_9H_{15}ClN_6O$ | 41.78 | 5.84 | 32.49 | 41.92 | 5.84 | 32.31 |
| 22 | $\begin{array}{c}CH_3\\N-\\CH_3\end{array}$ | $CH_3-$ | | | | | | | | |
| 23 | $\langle\rangle-$ | $CH_3-$ | | | | | | | | |
| 24 | $n-C_6H_{13}NH-$ | Cl | | | | | | | | |
| 25 | $\triangleright-CH_2NH-$ | Cl | | | | | | | | |
| 26 | $\triangleright-NH-$ | Cl | | | | | | | | |
| 27 | $CH_3-\langle\rangle-CH_2NH-$ | Cl | | | | | | | | |
| 28 | $Cl-\langle\rangle-NH-$ | Cl | | | | | | | | |
| 29 | $\langle\rangle-CH_2CH_2NH-$ | Cl | | | | | | | | |

TABLE—Continued

| | Starting material | | | Product | | | | | | |
|---|---|---|---|---|---|---|---|---|---|---|
| | | | | | | Analysis | | | | |
| | | | | | | Calculated | | | Found | | |
| Example | R | R¹ | M.P. (° C.) | Formula | C | H | N | C | H | N |
| 30 | $CF_3CH_2NH-$ | Cl | | | | | | | | |
| 31 | 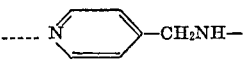—$CH_2NH-$ | Cl | | | | | | | | |
| 32 | 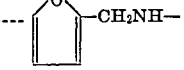—$CH_2NH-$ | Cl | | | | | | | | |
| 33 | $CH_2=CH-CH_2$\N—, $CH_3$\ | Cl | | | | | | | | |
| 34 | 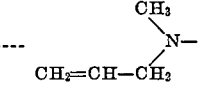 | Cl | | | | | | | | |
| 35 | 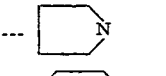—$CH_2-S-$ | Cl | | | | | | | | |
| 36 | H | Br | | | | | | | | |
| 37 | $NH_2-$ | H | | | | | | | | |
| 38 | $NH_2-$ | I | | | | | | | | |
| 39 | H | 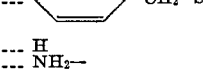 | | | | | | | | |
| 40 | H |  | | | | | | | | |
| 41 | H | $CF_3-$ | | | | | | | | |
| 42 | $CF_3-$ | H | | | | | | | | |

PREPARATION OF PYRAZINAMIDOGUANIDINES

Example 43.—1-(3,5-diamino-6-chloropyrazinamido)-3,3-dimethylguanidine

A mixture of 3,5-diamino-6-chloropyrazinoic acid hydrazide (1.0 g., 0.0049 mole), dimethyl cyanamide (1.0 ml.), and pyridine hydrochloride (2.0 g.) is heated at 125° C. for one hour. Water (10 ml.) is added to the cooled reaction mixture and the solution is made basic by the addition of aqueous sodium hydroxide. The solid that separates is collected and dried to give 1.03 g., M.P. 305–10° C. (dec.). Recrystallization from acetonitrile-water gives yellow crystals of 1-(3,5-diamino-6-chloropyrazinamido) - 3,3 - dimethylguanidine, M.P. 305–9° C. (dec.).

Analysis.—Calculated for $C_8H_{13}ClN_8O$ (percent): C, 35.23; H, 4.80; N, 41.09. Found (percent): C, 35.36; H, 4.85; N, 41.24.

Example 44.—1-(3,5-diamino-6-chloropyrazinamido)-3,3-diallylguanidine

A mixture of 3,5-diamino-6-chloropyrazinoic acid hydrazide (5.0 g., 0.025 mole), diallyl cyanamide (7.5 ml.), and pyridine hydrochloride (10 g.) is heated with stirring at 125–30° C. for two hours. Water (200 ml.) is added and the solution is made basic by the addition of a 20% sodium hydroxide solution. The solid which separates is collected on a filter and dried. The yield is 5.35 g. (66%), M.P. 155–60° C., resolidifies and then melts at 280° C. (dec.). Recrystallization from acetonitrile gives 1-(3,5-diamino - 6 - chloropyrazinamido) - 3,3 - diallylguanidine, M.P. 170° C., resolidifies and then melts at 280° C. (dec.).

Analysis.—Calculated for $C_{12}H_{17}ClN_8O$ (percent): C, 44.37; H, 5.28; N, 34.51. Found (percent): C, 44.07; H, 5.41; N, 34.73.

EXAMPLE 45.—1-(3,5-diamino-6-chloropyrazinamido)-3-t-butylguanidine

A mixture of 3,5-diamino-6-chloropyrazinoic acid hydrazide (5.0 g., 0.025 mole), t-butylcyanamide (7.5 ml.), and pyridine hydrochloride (10 g.) is heated at 125–30° C., for two hours. Water (100 ml.) is added followed by the addition of 20% sodium hydroxide solution (25 ml.). The solid which slowly separates is collected on a filter and dried. The yield is 6.32 g. (84%), M.P. 160° C., resolidifies and then melts at 275° C. (dec.). Recrystallization from acetonitrile gives yellow crystals of 1-(3,5-diamino - 6 - chloropyrazinamido)-3-t-butylguanidine, M.P. unchanged.

Analysis.—Calculated for $C_{10}H_{17}ClN_8O$ (percent): C, 39.93; H, 5.70; N, 37.26%. Found (percent): C, 40.10; H, 5.65; N, 37.17%.

Example 46.—1-(3-amino-6-chloropyrazinamido) guanidine

Employing the method of Example 45 but substituting for the 3,5-diamino-6-chloropyrazinoic acid hydrazide and t-butylcyanamide used therein, equivalent amounts of 3-amino-6-chloropyrazinoic acid hydrazide and either cyanamide, calcium cyanamide, or sodium hydrogen cyanamide respectively, there is produced 1-(3-amino-6-chloropyrazinamido)guanidine, M.P.>300° C.

Utilizing the method of Example 45, but substituting for the 3,5-diamino-6-chloropyrazinoic acid hydrazide, and the t-butylcyanamide used therein, equivalent amounts of 3-amino-5-R-6-R¹-pyrazinoic acid hydrazide described in Tables I and II and R²R³-cyanamide described in Table II respectively, there are produced the 1-(3-amino-5-R-6-R¹-pyrazinamido)-3-R²-3-R³-guanidines also described in Table II.

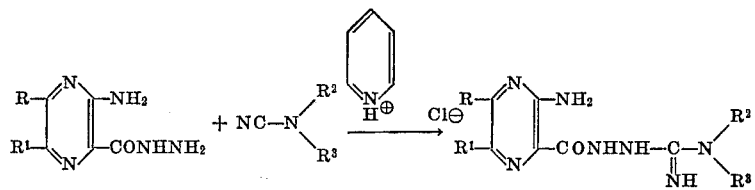

TABLE I

| Example | Starting material in example | R | R¹ | R² | R³ |
|---|---|---|---|---|---|
| 47 | 1 | $(C_2H_5)_2N-$ | Cl | H | H |
| 48 | 2 | $C_2H_5NH-$ | Cl | H | ⌬-$CH_2-$ |
| 49 | 3 | $CH_2=CH-CH_2NH-$ | Cl | H | ⌬-$CH_2-$ |
| 50 | 22 | $(CH_3)_2N-$ | $CH_3$ | $CH_2=CH-CH_2-$ | $CH_2=CH-CH_2-$ |
| 51 | 4 | $CH_3$⟩N–$C_2H_5$ | Cl | $n-C_4H_9-$ | $n-C_4H_9-$ |
| 52 | 5 | $(CH_3)_2CHNH-$ | Cl | $C_2H_5-$ | $C_2H_5-$ |
| 53 | 6 | $Cl-$⌬$-CH_2NH-$ | Cl | $CH_3-$ | $CH_3-$ |
| 54 | 32 | ⌬- | $CH_3$ | ⌬- | ⌬- |
| 55 | 7 | $CH_3NH-$ | Cl | | H |
| 56 | 8 | $n-C_4H_9NH-$ | Cl | $CH_3-$ | (naphthyl) |
| 57 | 9 | $n-C_3H_7-NH-$ | Cl | H | ⌬- |
| 58 | 10 | $HO(CH_2)_2NH-$ | Cl | H | H |
| 59 | 24 | $n-C_6H_{13}NH-$ | Cl | H | $t-C_4H_9-$ |
| 60 | 11 | (cyclopentyl)-NH- | Cl | H | |
| 61 | 12 | $(CH_3)_2N(CH_2)_2NH-$ | Cl | H | ⌬-$CH_2-$ |
| 62 | 13 | $CH_3S-$ | Cl | $CH_2=CH-CH_2-$ | $CH_2=CH-CH_2-$ |
| 63 | 14 | $HS-$ | Cl | $n-C_4H_9-$ | $n-C_4H_9-$ |
| 64 | 25 | ▷-$CH_2NH-$ | Cl | $C_2H_5-$ | $C_2H_5-$ |
| 65 | 15 | $HO-$ | Cl | | |
| 66 | 16 | $n-C_3H_7S-$ | Cl | $CH_3-$ | $CH_3-$ |
| 67 | 17 | $CH_3-$ | Br | ⌬- | ⌬- |
| 68 | 26 | ▷-$NH-$ | Cl | H | H |
| 69 | 27 | $CH_3-$⌬-$CH_2NH-$ | Cl | $CH_3-$ | (naphthyl) |
| 70 | 28 | $Cl-$⌬-$NH-$ | Cl | H | ⌬- |
| 71 | 29 | ⌬-$(CH_2)_2NH-$ | Cl | H | H |
| 72 | 18 | $(CH_3)_2N-$ | ⌬- | H | $t-C_4H_9-$ |
| 73 | 30 | $CF_3CH_2NH-$ | Cl | H | H |
| 74 | 31 | (pyridyl)-$CH_2NH-$ | Cl | H | ⌬-$CH_2-$ |

TABLE 1—Continued

| Example | Starting material in example | R | R¹ | R² | R³ |
|---|---|---|---|---|---|
| 75 | 32 | (furfuryl)-CH₂NH— | Cl | CH₂=CH—CH₂— | CH₂=CH—CH₂— |
| 76 | 19 | C₂H₅S— | Cl | n-C₄H₉— | n-C₄H₉— |
| 77 | 20 | n-C₅H₁₁S— | Cl | C₂H₅— | C₂H₅— |
| 78 | 33 | CH₃(CH₂=CHCH₂)N— | Cl | H | H |
| 79 | 34 | (pyrrolidinyl)N— | Cl | CH₃— | CH₃— |
| 80 | 21 | CH₃(n-C₃H₇)N— | Cl | phenyl | phenyl |
| 81 | 35 | phenyl-CH₂S— | Cl | H | phenyl |
| 82 | 36 | H | Br | H | H |
| 83 | 37 | NH₂— | H | H | H |
| 84 | 38 | NH₂— | I | H | H |
| 85 | 39 | H | cyclopropyl | H | H |
| 86 | 40 | H | cyclohexyl | H | H |
| 87 | 41 | H | CF₃— | H | H |
| 88 | 42 | CF₃— | H | H | H |
| 89 | Known | NH₂— | Cl | H | H |
| 90 | Known | (CH₃)₂N— | Cl | H | H |

The products of this invention can be administered to man and animals in unit dosage form in pills, tablets, capsules, injectable preparations and the like as in conventional pharmaceutical practice. It will be appreciated that the dosage of each individual compound will vary over a wide range depending upon the relative potency of the selected compound and also depending upon the age and weight of the particular patient to be treated and upon the particular ailment to be treated. For these reasons, tablets, pills, capsules and the like containing for example from 5 to 500 mgs. or more or less active ingredient can be made available for the symptomatic adjustment of the dosage to the individual patient. The compounds of this invention can be administered either alone or combined with other therapeutic agents advantageously at a dosage range of from 5 mg./day to about 1000 mg./day or at a somewhat higher or lower dosage at the physician's discretion, preferably on a 1 to 3 times a day regimen.

Each of the compounds of this invention can be incorporated in a dosage form similar to that described in the following example, or any other of the usual dosage forms suitable for oral or parenteral administration, which can be prepared by well known methods.

Example 91.—Dry filled capsule containing 50 mg. of active ingredient

|  | Per capsule mg. |
|---|---|
| 1-(3-amino-6-chloropyrazinamido)-3-t-butylguanidine | 100 |
| Lactose | 223 |
| Magnesium stearate | 2 |
| Mixed powders | 325 |

Mix the 1-(3-amino-6-chloropyrazinamido)-3-t-butylguanidine, lactose and magnesium stearate and reduce to a No. 60 mesh powder. Encapsulate, filling 325 mg. in each No. 2 capsule.

It is also contemplated to combine the compounds of this invention with other hypotensive agents or with other therapeutic agents.

What is claimed is:
1. The process for the preparation of a compound of structural formula

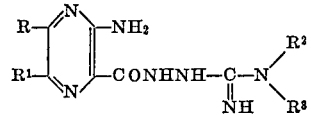

which comprises the reaction of a compound of structural formula

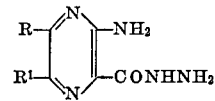

with a compound of structural formula

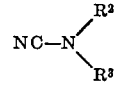

in the presence of pyridine hydrochloride at a temperature between the melting point of the mixture and 150° C. wherein in each of the foregoing structures R is a member selected from the group consisting of:
(a) hydrogen,
(b) hydroxy,
(c) lower alkyl,
(d) phenyl, halo-phenyl,
(e) mercapto,
(f) lower alkylthio,
(g) phenyl-lower alkylthio,
(h) trifluoromethyl,
(i)

wherein $R^5$ is a member selected from the group consisting of:
- (1) hydrogen,
- (2) lower alkyl,
- (3) lower alkenyl, and $R^6$ is a member selected from the group consisting of:
- (1) hydrogen,
- (2) lower alkenyl,
- (3) $C_{3-8}$ cycloalkyl,
- (4) halo-phenyl,
- (5) lower alkyl,
- (6) hydroxy-lower alkyl,
- (7) di(lower alkyl)amino-lower alkyl,
- (8) $C_{3-8}$ cycloalkyl-lower alkyl,
- (9) phenyl-lower alkyl,
- (10) lower alkyl-phenyl-lower alkyl,
- (11) halo-phenyl-lower alkyl,
- (12) $\omega,\omega,\omega$-trifluoro-lower alkyl,
- (13) pyridyl-lower alkyl,
- (14) furyl-lower alkyl, and $R^5$ and $R^6$ when lower alkyl can be linked together to form with the nitrogen atom to which they are attached, a heterocyclic group selected from 1-pyrrolidinyl, and piperidino;

$R^1$ is a member selected from the group consisting of:
- (a) hydrogen,
- (b) halogen,
- (c) lower alkyl,
- (d) $C_{3-6}$ cycloalkyl,
- (e) phenyl, and
- (f) trifluoromethyl;

$R^2$ and $R^3$ can be similar or dissimilar and each is a member selected from the group consisting of:
- (a) hydrogen,
- (b) lower alkyl,
- (c) phenyl-lower alkyl,
- (d) phenyl,
- (e) naphthyl, and
- (f) lower alkenyl.

2. The process as claimed in claim 1, wherein $R^2$ and $R^3$ are hydrogen.

3. The process as claimed in claim 1, wherein $R^2$ and $R^3$ are hydrogen, and $R^1$ is chloro.

4. The process as claimed in claim 1, wherein R, $R^2$ and $R^3$ are hydrogen, and $R^1$ is chloro.

5. The process as claimed in claim 1, wherein R is amino, $R^2$ and $R^3$ are hydrogen, and $R^1$ is chloro.

References Cited

UNITED STATES PATENTS 3,325,494   6/1967   Weinstock et al. ____ 260—250

NICHOLAS S. RIZZO, Primary Examiner

UNITED STATES PATENT OFFICE
CERTIFICATE OF CORRECTION

Patent No. 3,527,759  Dated September 8, 1970

Inventor(s) Kenneth L. Shepard

It is certified that error appears in the above-identified patent and that said Letters Patent are hereby corrected as shown below:

In column 3, line 23, change "relation" to read --related--. In column 10, change "TABLE I" to read --TABLE II--. In Table II, Example 49, in the column headed "$R^3$" insert --H--; in Example 50, in the column headed "R", change "$(CH_3)_2N_3$-" to read -- $(CH_3)_2N$- --; in Example 50, in the column headed "$R^1$", change "$CH_3$" to read -- $CH_3$- --; in Example 54, in the column headed "Starting material in example" change "32" to read --23--; in Example 54, in the column headed "$R^1$", change "$CH_3$" to read -- $CH_3$- --; in Example 55, in the column headed "$R^2$" insert --H--; in Example 60, in the column headed "$R^3$" insert --H--; in Example 65, in the column headed "$R^2$" insert --H--; in Example 65, in the column headed "$R^3$" insert --H--. In the heading bridging columns 11 and 12, change "TABLE I" to read --TABLE II--.

SIGNED AND
SEALED
JAN 5 1971

(SEAL)
Attest:

Edward M. Fletcher, Jr.
Attesting Officer

WILLIAM E. SCHUYLER, JR.
Commissioner of Patents